Dec. 23, 1969 T. DE HAAS 3,485,949
DIFFERENTIAL PHASE SHIFT KEYING RECEIVER WITH
INFORMATION MODULATED ON A PLURALITY OF TONES
Filed May 2, 1966 2 Sheets-Sheet 1

INVENTOR.
THIJS DeHAAS
BY
[signature]
ATTORNEY

Dec. 23, 1969 T. DE HAAS 3,485,949

DIFFERENTIAL PHASE SHIFT KEYING RECEIVER WITH INFORMATION MODULATED ON A PLURALITY OF TONES

Filed May 2, 1966 2 Sheets-Sheet 2

INVENTOR.
THIJS DeHAAS
BY
ATTORNEY

United States Patent Office 3,485,949
Patented Dec. 23, 1969

3,485,949

DIFFERENTIAL PHASE SHIFT KEYING RECEIVER WITH INFORMATION MODULATED ON A PLURALITY OF TONES

Thijs de Haas, Rochester, N.Y., assignor to General Dynamics Corporation, a corporation of Delaware Filed May 2, 1966, Ser. No. 546,890
Int. Cl. H04l 27/24
U.S. Cl. 178—67 10 Claims

ABSTRACT OF THE DISCLOSURE

A time differential phase shift keyed communication system is described wherein four bits of digital information are transmitted on four different tones. In the receiver, the tones are correlation detected and the detected output which represents the phase information of each tone is translated to a processing frequency, say ten times higher than the tone frequency. Digital logic alters the phase of the processing signal in accordance with any deviations between the phase thereof and any of the possible phase states which the processing signal may assume. The processing signal is phase shifted in accordance with the modulation of the information tone which was detected during the preceding symbol interval. The digital information which is transmitted by the tone is then derived by digital logic operated by levels produced by the phase modulated processing signal and the processing signal which contains the information as to the data transmitted during the preceding symbol interval.

The present invention relates to communications systems, and particularly to systems for the communication of digital information.

The invention is especially suitable for use in phase shift keyed communications systems wherein successive signal elements on each of a plurality of information tones are phase shifted by discrete angles which represent different bits or combinations of bits of digital information. The bits are representative of various symbols which may be transmitted by the signal elements, thus the time duration of a signal element may be termed a symbol interval.

The invention may be applied to time differential phase shift keyed communications systems. In such systems the symbol which is transmitted is represented by the differential phase shift between the tone as transmitted in successive pairs of symbol intervals. Known time differential phase shift keyed communication systems utilize complex circuitry in order to store the phase state of the tone in a preceding symbol interval so that it can be compared with the tone in the next symbol interval in order to derive the differential phase shift between such successive tones. A disadvantage of such known systems is that phase fluctuations due to noise are retained in the stored phase state derived from the preceding symbol interval which manifests itself as an increase in error rate of the information which is derived from the system. The complex circuitry in known time differential phase shift keyed communications systems may involve the use of bulky elements, such as inductors and filters, which are not adaptable to miniaturization and which do not exhibit a high degree of reliability.

Accordingly, it is an object of the present invention to provide an improved time differential phase shift keyed communication system in which the foregoing difficulties and disadvantages are obviated.

It is a further object of the present invention to provide an improved system which is designed to facilitate the use of coherent detection processes and thereby has improved error performance even in the presence of noise.

It is a still further object of the present invention to provide an improved communication system in which information is transmitted in terms of phase modulation wherein variations in transmission characteristics of the communication link and in synchronism between receiving and transmitting portions of the system are automatically compensated.

It is a still further object of the present invention to provide an improved system for communicating information in terms of discrete phase modulation of information tones which adapts itself to compensate for perturbations in the phase characteristics of the system and of the communications link therebetween.

It is a still further object of the present invention to provide an improved communication system in which information is transmitted in terms of the phase shift keyed tones wherein the need for tuned circuits is minimized and which is adapted to use integrated circuits.

It is a still further object of the present invention to provide an improved communication system wherein information is transmitted in terms of phase modulation of a plurality of tones which is simpler in construction and more reliable than systems of this type which have heretofore been available.

Briefly described, a system embodying the invention is operative for communicating information on a phase modulated tone. The information, such as a binary bit, or patterns of digital information may be in terms of differential phase modulation of the tone as transmitted in successive symbol intervals. In other words, the phase relationship of the tone in successive symbol intervals represents the transmitted information. This information tone may be transmitted alone or together with other information tones of different frequency from a transmitting point to a receiving point via a communications link, such as a wire line or radio link. A detection circuit which may operate in accordance with coherent detection techniques is located at the receiving point and provides an output which is a function of the phase modulation of the tone during each symbol interval. A system for recovering the information from the detection circuit output includes a frequency generator, such as may be driven by a local frequency standard or clock at the receiving point, provides a processing signal of frequency which may be higher than the frequency of the information tones, which processing signal may be varied or shifted in phase. This processing signal is modulated by the output from the coherent detection circuit so as to provide a modulated processing signal having phase modulation in each symbol interval which is a function of the phase modulation of the information tone. A comparison network responsive to the modulated processing frequency signal compares that signal with a signal derived from the local clock for controlling the phase of the processing frequency signal from the generator. Thus the recovery system is self-adaptive in that the phase of the processing frequency signal changes to accommodate perturbations in the phase of the transmitted tone which may be introduced by the transmission media or elements in the system itself.

More specifically, the comparison system operates by sensing the deviations of the phase modulated processing signal from any of the phase states which that signal may assume by virtue of the discrete phase modulation of the information tone. An error signal is derived which alters the phase of the processing signal in accordance with such sensed deviations, thereby phaselocking and synchronizing the local signal with the transmitted tone as though the transmitted tone were unmodulated. The digital information which is transmitted is derived by comparing the phase of the modulated processing frequency signal with the phase of the unmodulated processing frequency signal as derived from the generator during each symbol interval. Before comparing the phase of the locally-generated processing frequency signal with the modulated processing frequency, the phase of the former signal is shifted in accordance with the modulation of the information tone which was detected during the preceding symbol interval. The digital information may be represented by discrete admissible phase states. The phase of the locally-generated processing signal is shifted to assume the one of such states dictated by the information which was detected during the preceding symbol interval. Phase fluctuations due, for example, to noise in the preceding symbol interval are therefore not reflected in the reference; thus improving the error performance of the system. The comparison process provides improved time differential demodulation of the received information tone.

The invention itself, both as to its organization and method of operation, as well as additional objects and advantages thereof will become more readily apparent from a reading of the following description in connection with the accompanying drawings in which.

Figures 1, 2, 4:
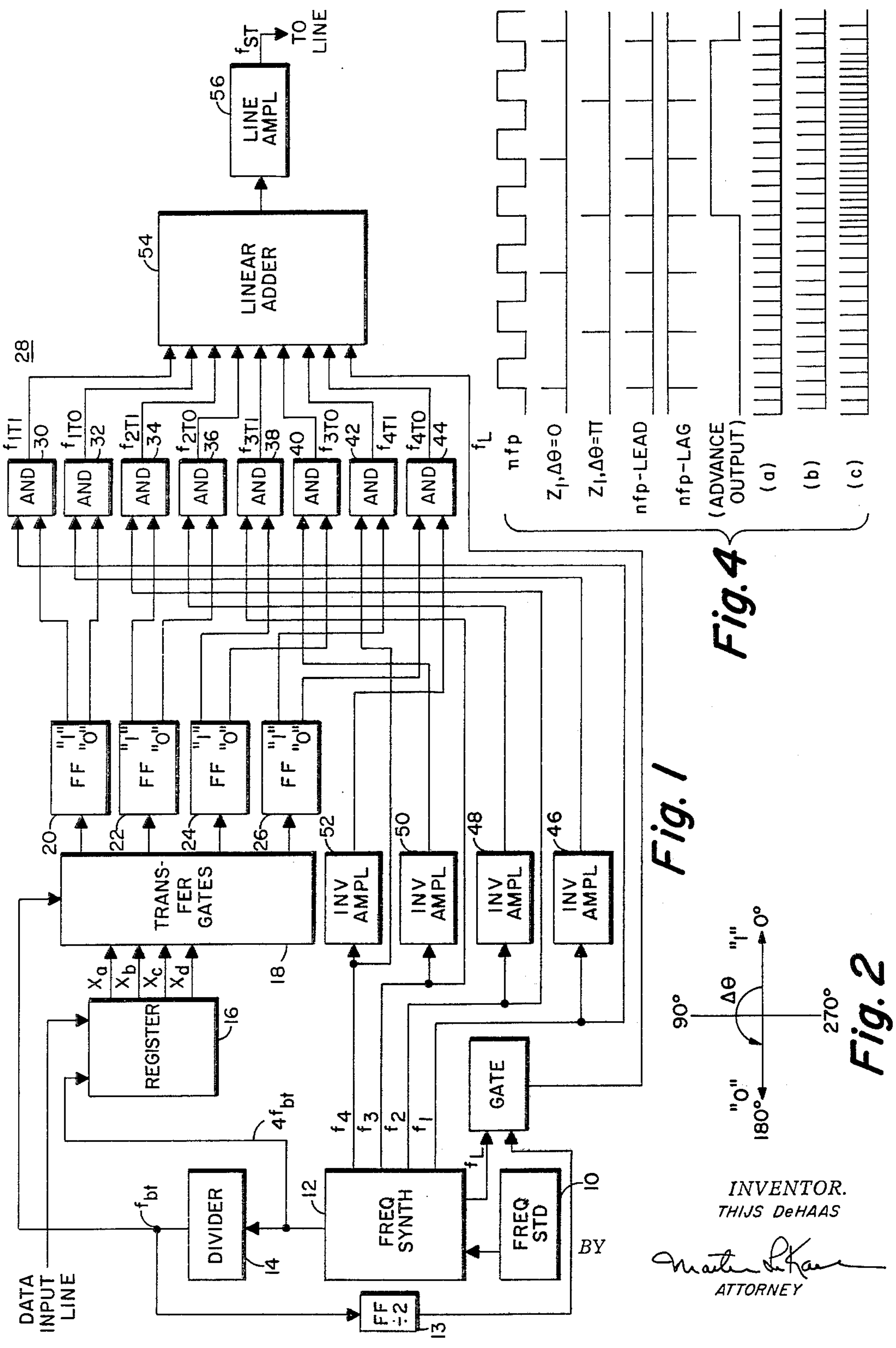
FIGURE 1 is a simplified block diagram of the transmitter portion of a system embodying the invnetion.
FIGURE 2 is a vector diagram representing the phase coding of the information tones transmitted by the transmitter portion of the system, as shown in FIGURE 1.
FIGURE 4 is a wave form diagram, showing wave forms which appear in the local processing frequency phase control circuitry of the receiver portion shown in FIGURE 3.

Referring to FIGURE 1, there is shown a frequency standard 10 which may be a crystal controlled temperature stabilized oscillator, operating at a fixed frequency, say 1 mc./s. A frequency synthesizer 12 receives the output frequency of the standard 10 and synthesizes therefrom the information tones, four of which, $f_1$, $f_2$, $f_3$ and $f_4$ are indicated as being generated in this illustrative embodiment. It will be appreciated, of course, that additional tones may be generated. These tones may be adjacent to each other in frequency and may be separated by a fixed frequency which is a harmonic of the time base frequency of the system. The time base frequency is indicated as $f_{bt}$ and is obtained by means of a frequency divider 14 which is driven by a signal of $4f_{bt}$, which is obtained from the synthesizer. The divider includes limiter circuits for translating the $4f_{bt}$ signal into a square wave train. Accordingly, the divider may be a pair of flip-flops connected in tandem, and the $f_{bt}$ signal may similarly be a square wave. In the interest of convenience, the time base frequency $f_{bt}$ may be a subharmonic of the frequency standard frequency, say 100 c./s., and the tones $f_1$, $f_2$, $f_3$ and $f_4$ may be higher subharmonics, say 1000 c./s., 1100 c./s., 1200 c./s. and 1300 c./s., respectively. Another signal of frequency $f_L$ which may also be a harmonic of the time base frequency is also generated by the frequency synthesizer 12. $f_L$ may suitably be 2000 c./s. The $f_L$ signal is transmitted for synchronizing purposes as will appear presently.

The data which is to be transmitted enters from a data input line and is read into a register 16 by read-in pulses obtained from the leading edge $4f_{bt}$ pulses. Thus four bits, indicated as $X_a$, $X_b$, $X_c$ and $X_d$ are stored in the last stages of the register 16 during each time base interval. These bits are transferred out of the register via transfer gates 18, which are enabled by a pulse derived from the leading edge of the time base signal $f_{bt}$. Pulse generators which are used to derive the properly timed pulses are omitted from the drawing in the interest of simplicity. The output pulse $X_a$, which may be either a binary "one" or a binary "zero" bit is transferred for temporary storage to a flip-flop 20. The bits $X_b$, $X_c$ and $X_d$ are similarly transferred to flip-flops 22, 24 and 26, respectively. The inputs to these flip-flops have suitable steering circuits so that if the bit applied thereto is a level corresponding to a "one" bit, the flip-flop remains in the same state. If the input level represents a "zero" bit, the flip-flop will be switched to its complementary state.

The phase shift keying or modulation of the information tones is accomplished by a series of AND gates 28. Two gates, 30 and 32 are provided for the $f_1$ tone. A pair of gates 34 and 36 are provided for the $f_2$ tone. A pair of gates 38 and 40 are provided for the $f_3$ tone. A pair of gates 42 and 44 are provided for the $f_4$ tone.

The gates 30 and 32 are input connected to the "one" and "zero" outputs of the flip-flop 20 which stores the $X_a$ bit. Accordingly, the gate 30 is enabled if the $X_a$ bit is a "one" bit which follows a "zero" bit or a "zero" bit which follows a "zero" bit and the gate 32 is enabled if the $X_a$ bit is a "zero" bit which follows a "one" bit or a "one" bit which follows a "one" bit. The $f_1$ tone is directly applied to the gate 30 while the $f_1$ tone shift in phase by 180° in an inverting amplifier 46 is applied to the gate 32. During each symbol interval (the period of $f_{bt}$ signal) either the AND gate 30 or the AND gate 32 will provide an output. The output will be a tone $f_{1T1}$ in the event that the gate 30 is enabled. The AND gate 32 will provide an output tone $f_{1T0}$, which is inverted in phase with respect to $f_{1T1}$ tone. Accordingly, the differential phase modulation $\Delta\theta$ of the $f_{1T}$ tone transmitted in a successive pair of symbol intervals indicates the value of the bit. This relationship is illustrated in FIGURE 2.

Inverting amplifiers 48, 50 and 52, similar to the inverting amplifier 46, are used to invert the phase of the $f_2$, $f_3$ and $f_4$ bits and the AND gates 34, 36, 38, 40, 42 and 44 transmit either the information tones $f_{2T1}$, $f_{3T1}$ and $f_{4T1}$ or the 180° phase shift version of these tones $f_{2T0}$, $f_{3T0}$, and $f_{4T0}$. All of the information tones are combined in a linear adder 54 which may be a resistor matrix and applied to a line amplifier 56, which transmits a combined output signal $f_{ST}$ to a line. In the event that a radio link is used, the $f_{ST}$ signal may be applied to a radio transmitter and transmitted to the receiving point over a radio link. The $f_{ST}$ signal may be applied directly to a wire line in the event that the wire line is used as the communication link.

The synchronizing tone $f_L$ is transmitted in bursts of duration equal to the time base interval. These bursts are provided by gating the $f_L$ signal with a $f_{bt/2}$ square wave obtained from a flip-flop divider 13. Accordingly, the gate is enabled only during one half cycle of the $f_{bt/2}$ square wave. The synchronizing signal is also combined in the linear adder 54 with the information tones and transmitted via the line amplifier 56 over the link.

Figure 3:
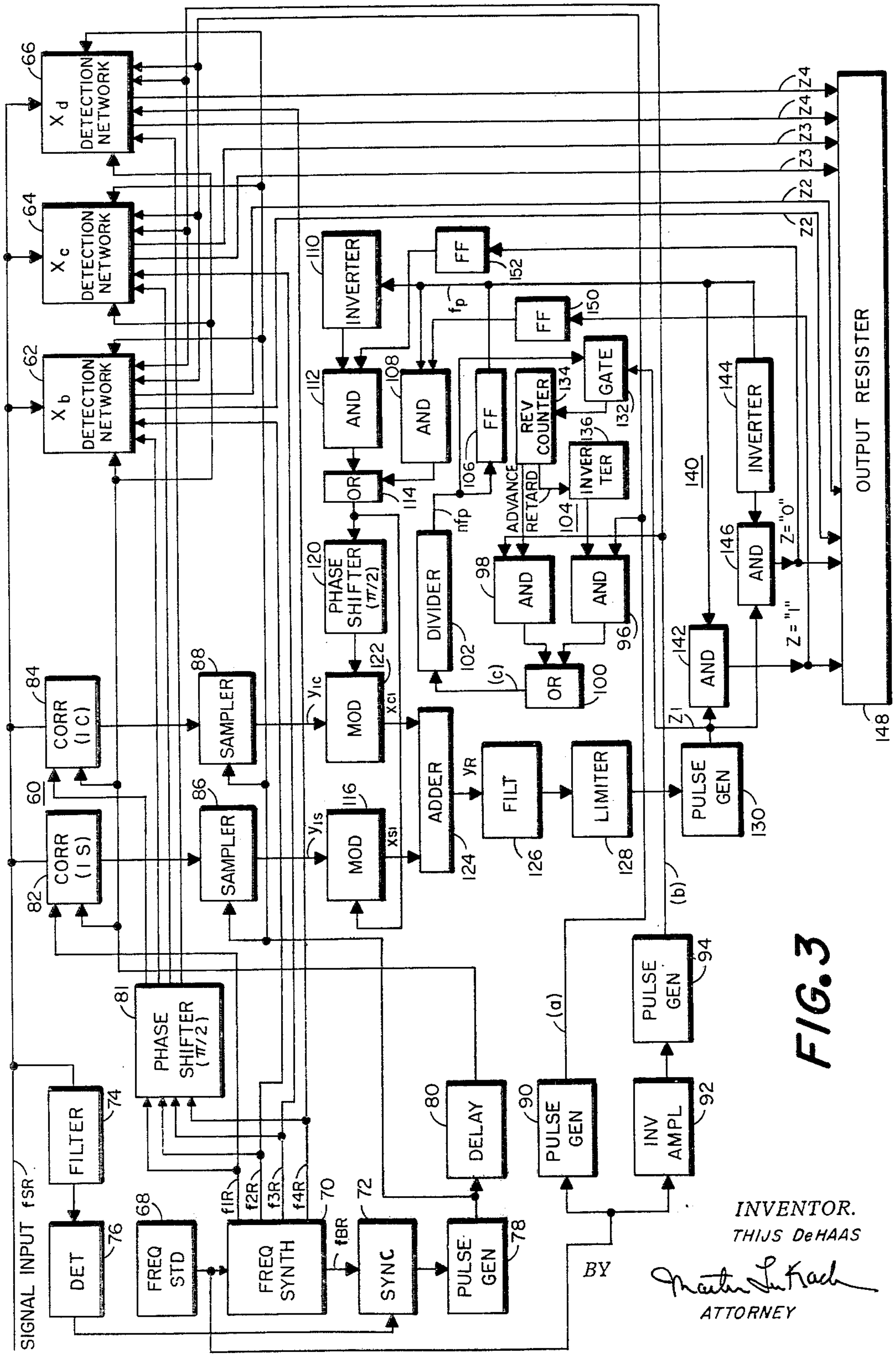
FIGURE 3 is a simplified block diagram of the receiver portion of a system embodying the invention.

The total transmitted signal appears at the signal input of the receiving portion of the system (FIGURE 3), and is indicated as $f_{SR}$. This signal is applied to four detection networks, 60, 62, 64 and 66, which operate to derive the $X_a$, $X_b$, $X_c$ and $X_d$ bits respectively. Only the network 60 for recovering the $X_a$ bit is shown in detail in FIGURE 3. The other networks 62, 64 and 66 are similar.

Signals for use in correlation detection and timing in the detection networks are locally generated by means of a frequency standard 68, similar to the standard 10, a frequency synthesizer 70, which is driven by the standard, and a synchronizing network 72. The synthesizer 70 may be similar to the synthesizer 12. The locally generated reference frequencies are designated as $f_{1R}$, $f_{2R}$, $f_{3R}$ and $f_{4R}$ and are equal in frequency to $f_1$, $f_2$, $f_3$ and $f_4$. The synthesizer also produces a receiver time base signal $f_{br}$, which is equal in frequency to $f_{bt}$. The synchronizing circuit 72 is operative to synchronize the receiver time base frequency $f_{br}$ with the transmitter time base frequency $f_{bt}$.

A filter 74, which extracts the $f_L$ signal from the total input signal $f_{SR}$ is applied to a peak detector 76. Since the transmitted $f_L$ signal is in the form of bursts, synchronized with the transmitter time base $f_{bt}$, the detector 76 will produce a square wave also synchronized with $f_{bt}$. The synchronizing circuit 72 includes gating circuits which compare the $f_{br}$ and the $f_{bt}$ signals and provide advance and retard pulses which are indicative of the sense of misalignments in the time position therebetween. These advance and retard pulses may be integrated as in RC circuits and may be applied to a voltage controlled astable multivibrator which regenerates the receiver time base $f_{br}$ so as to advance or delay the output pulses produced by that multivibrator. Since such voltage controlled multivibrator circuits are known in the art, they will not be described in detail herein.

The synchronized receiver time base of frequency $f_{br}$ is applied to a pulse generator 78, which shapes the synchronizing circuit output signal $f_{br}$ into a pulse which occurs at the end of the symbol interval, for example, the pulse may terminate at the positive going zero cross-over of the signal $f_{br}$. The output of the pulse generator 78 is also applied to a delay circuit 80 which provides a short pulse which occurs at the beginning of each symbol interval. It may be desirable to combine the pulse generator 78 and the delay circuit 80 into a single circuit which provides a pulse, occurring during the positive going zero crossover of the signal $f_{br}$. The leading edge of this pulse then will occur just before the end of the symbol interval and the trailing edge of this pulse will occur just at the beginning of the next symbol interval. Pulses generated in response to this trailing edge and this leading edge may then be used instead of the output pulse of the pulse generator 78 and the delay circuits 80, respectively.

The locally generated signals of frequency $f_{1R}$ through $f_{4R}$ are each shifted in phase in 90° phase shifters 81. These phase shifted signals and the locally generated signals $f_{1R}$ and $f_{4R}$ are used in the correlation detection process.

The total incoming signal is applied to the correlators 82 and 84 of the network 60. The correlator 82 is a sine correlator which operates on the $f_1$ tone and is labeled (1S). The correlator 84 is a cosine correlator and is labeled (1C). The phase shifted $f_{1R}$ tone is applied to the cosine correlator 84, while the $f_{1R}$ tone is directly applied to the sine correlator 82. The total incoming signal which is applied to these correlators may, ignoring the $f_1$ transmitted tone, be represented by the following expression:

$$A_1 \sin(2\pi f_{1T}t+\theta_1)+A_2 \sin(2\pi f_{2T}t+\theta_2) + A_3 \sin(2\pi f_{3T}t+\theta_3)+A_4 \sin(2\pi f_{4T}t+\theta_4) \quad (1)$$

Where $A_1$ through $A_4$ represents the amplitudes of the frequency components of these tones and $\theta_1$ through $\theta_4$ represents the phase shifts thereof. The correlators 82 and 84 are output coupled to sampler circuits provided, as by analog gates 86 and 88. The correlator 82 and the sampler 86 provide an output $y_{1S}$ which is a cosine function of the phase modulation of the $f_{1T}$ tone. The correlator 84 and the sampler 88 provide an output $y_{1C}$ which is the sine function of the phase modulation angle $\theta_1$. In providing these outputs, the correlators multiply and integrate over the receiver time base the signals applied thereto. Thus the correlators 82 and 84 may include diode multipliers and RC integrating circuits which follow the multipliers. The integrator is reset, as by discharging the capacitor thereof at the beginning of the symbol interval by means of the output pulse from the delay circuit 80. To this end diodes may be connected across the capacitor and biased in the forward direction during the interval of the pulse from the delay circuit 80. A pair of diodes, polarized in opposite directions, may be used to insure that the capacitors in the correlators are discharged, notwithstanding the polarity to which they are charged during the symbol interval. The samplers 86 and 88 detect the output of their correlators at the end of the symbol interval. The samplers may be analog gate circuits which are enabled by the pulse from the pulse generator 78 and provide the outputs $y_{1S}$ and $y_{1C}$. As indicated above, the output of the sampler 86 may be expressed by the following equation:

$$y_{1S}=A_1 \cos \theta_1 \quad (2)$$

and the output of the sampler 88 may be expressed by the following equation:

$$y_{1C}=A_1 \sin \theta_1 \quad (3)$$

where $\theta_1$ is measured with respect to the start of the time base.

The $X_1$ bit is recovered by the recovery system which follows the samplers 86 and 88. This recovery system makes use of a processing frequency signal of frequency $f_p$ which is suitably much higher than the frequency of the information tones. In the illustrative case when the information tones are all about 1000 c./s., the processing frequency may be 10 kc./s.

In order to obtain this processing frequency, the output signal from the frequency standard is translated into a pair of pulse trains at the frequency of the signal produced by the standard 68. The pulses of these trains are, however, displaced one half period with respect to each other. One of these pulse trains may be generated by a pulse generator 90 which provides a pulse at the positive going zero cross-over of each cycle of the signal from the standard. The pulse train provided by this pulse generator 90 is illustrated in wave form (*a*) in FIGURE 4. The frequency standard is also connected to an inverting amplifier 92 and applied to a pulse generator 94, similar to the generator 90. Since this pulse generator also provides an output pulse at the positive going zero cross-over of the signal applied thereto, the pulse train (*b*) produced thereby will be at the same frequency, but 180°, or one half period displaced with respect to pulse train (*a*). The later pulse train is also illustrated in FIGURE 4.

These pulse trains (*a*) and (*b*) are passed through AND gates 96 and 98, combined in an OR gate 100 and applied to a divider 102 which may be a flip-flop counter chain which divides the pulses to provide an output frequency equal to $nf_p$, which is $n$ times the processing frequency, where $n$ is the number of possible phase states of the modulated tone. In the illustrated case this number of phase states is two. Accordingly, $nf_p$ is twice the processing frequency $f_p$. The AND gates 96 and 98 are included in logic circuit 104 for correcting the phase of the processing signal, as will appear hereinafter.

A flip-flop 106 divides the $nf_p$ signal from the divider 102 to provide the processing frequency signal $f_p$. This signal is applied to the input of a gate 108 and to an inverter amplifier 110. The inverter amplifier 110 inverts the $f_p$ signal by 180° and applies it to the input of another AND gate 112. The output of these AND gates is combined in an OR gate 114. The output of the OR gate 114 is connected to one input of a modulator 116, which receives the output $y_{1S}$ from the sampler 86. A signal corresponding to the cosine of the processing frequency signal is obtained by phase shifting the output signal from the OR gate 114 in a $\pi/2$ phase shifter 120. This cosine signal is applied to a modulator 122 which receives the output $y_{1C}$ from the sampler 88. The AND gates 108 and 112 and the inverter 110 are used in the time differential demodulation process for determining the phase of the processing frequency signal so that it represents the phase of the information tone in the preceding symbol interval, thereby permitting the differential phase shift of the information tone in successive symbol intervals to be determined. It will be recalled that the time differential phase displacement represents the value of the $X_a$ bit. The mode of operation of the time differential detection process will become apparent as the description proceeds.

The modulators 116 and 122 may be multiplier circuits. Amplifiers in which the $y_{1S}$ and $y_{1C}$ signals are chopped by the processing frequency signals may be suitable. The output of the modulator 116 is therefore the product of the sine or cosine processing signal and outputs $y_{1S}$ and $y_{1C}$, respectively. Assuming that the processing frequency signal has a phase displacement, measured with respect to the start of the time base, which is generally indicated as $\phi$, the output of the modulator 116 may be represented as $X_{SI}$ by the following equations:

$$X_{SI}=A_1 \cos \theta_1 \sin (2\pi f_p+\phi)$$
$$=\frac{A_1}{2}[\sin (2\pi f_p+\phi+\theta_1)+\sin (2\pi f_p+\phi-\theta_1)] \quad (4)$$

Similarly the output of the modulator 122 may be represented as $X_{CI}$ by the following equations:

$$X_{CI}=A_1 \sin \theta_1 \cos (2\pi f_p+\phi)$$
$$=\frac{A_1}{2}[\sin (2\pi f_p+\phi+\theta_1)-\sin (2\pi f_p+\phi-\theta_1)] \quad (5)$$

It will be apparent that the expanded forms of equations 4 and 5 are obtained by the application of trigonometric identities. An adder circuit 124, which may be a linear adder, derives the sum of the $X_{SI}$ and $X_{CI}$ outputs which may be expressed as $y_R$, as will be observed in the following equation:

$$y_R=A_1 \sin (2\pi f_p+\phi+\theta_1) \quad (6)$$

This output $y_R$ is filtered in a band pass filter 126 to eliminate any spurious frequency components that might be generated in the modulators and limited in a limiter 128 which translates $y_R$ into a square wave. A pulse generator 130 provides a pulse at the positive going zero cross-over of the square wave. This pulse is used both for synchronizing and output information derivation purposes.

The position of the output pulse from the pulse generator 130, indicated as $Z_1$, for the sake of convenience, represents the phase angle of the information tone $f_{1T}$ as a function of both the locally-generated reference frequency input $f_{1R}$ to the correlators 82 and 84 and the processing frequency signal input to the modulator 116 and 120. This phase angle is with reference to the processing frequency $f_p$, as produced by the divider 102 and the flip-flop 106. The foregoing statement will also appear from Equation 6. In addition to the phase modulation, the reference frequency $f_{1R}$ may have a further phase shift with respect to the information tone $f_{1T}$ which may be represented as $\Delta\psi$. Since the modulation phase shifts as either 0 or $\pi$ radians the phase angle of $f_{1T}$ information tone $\theta_1$ may be represented by either of the following equations:

$$\theta_1=0+\Delta\psi \text{ or } \theta_1=\pi+\Delta\psi \quad (7)$$

If the phase $\phi$ of the processing frequency $f_p$ were made equal to $-\Delta\psi$, the phase perturbations due to misalignment or lack of adjustment of the reference frequency $f_{1R}$ and the information tone $f_{1T}$ may be removed, thereby removing the correlator reference frequency signals as a variable in determining the position of the Z pulse. The removal of this perturbing phase angle $\Delta\psi$ is very advantageous inasmuch as it permits the use of coherent demodulation as exemplified by correlation detection which depends upon the generation of a local reference frequency phase lock synchronized with the information tone. Such coherent detection techniques improve the error performance of the systetm and make the system less sensitive to noise.

The removal of the unwanted phase displacement is obtained by the logic circuit 104, which compares the phase positions of the $Z_1$ pulse with the admissible phase positions thereof. These admissible phase positions are manifested by the $nf_p$ signal and are applied to a gate 132, together with the $Z_1$ pulse. The $nf_p$ signal is illustrated in FIGURE 4, as is the position of the $Z_1$ pulse in both of the possible phase positions thereof (viz. 0 and $\pi$). It will be observed that if the $nf_p$ signal leads the $Z_1$ pulse, the $Z_1$ pulse will be coincident with the high level portion thereof, thereby producing a train of positive pulses at the gate 132 output. On the other hand, if the $nf_p$ signal lags, the $Z_1$ pulse will be coincident with the negative portion thereof, thereby gating out negative pulses.

The positive or negative pulses as provided by the gate 132 are applied to a reversible counter 134, which counts down in the event that positive pulses are applied thereto and up in the event that negative pulses are applied thereto. The reversible counter may be designed to reach a count of four, either in an upwards or downward direction before it provides an output level, either on an advance or retard output line, depending upon whether the count was in an upward direction or in a downward direction. Thus the counter 134 provides some digital integration and reduces the effects of noise in the self-adaptive phase adjusting process.

The advance output of the counter 134 is illustrated, by way of example, in FIGURE 4. The advance output is connected to the AND gate 98, while the retard output is inverted in an inverter circuit 136 and applied to the AND gate 96. By virtue of the inverter circuits' presence in the logic 104, the AND gate 96 is normally enabled and passes the pulse train (*a*) from the pulse generator. On occurrences of the advance output, the AND gate 98 is also enabled, thereby passing the pulse train (*b*). Both pulse trains are combined in the OR gate 100, which provides the pulse train (*c*), which contains twice the normal number of pulses during the interval of the advance output. The divider therefore produces an output pulse corresponding to the $nf_p$ signal at an earlier instant in time and the phase of the processing frequency is effectively advanced. In the event that a retard level is produced by the counter 134, the inverter operates to inhibit the gate 96, thereby cutting off pulses to the divider for a period of time. This process delays the generation of the next $nf_p$ pulse and effectively retards the phase of the processing signal. The logic 104 is therefore an effective phase locking loop which corrects variations in the phase relationship between the correlator reference frequency and the information tone.

The information may be obtained from the $Z_1$ tone by means of a symbol phase detector 140. An AND gate 142, to which the $Z_1$ tone and the processing frequency signal are applied, will produce an output indicative of the $Z_1$ tone representing a binary "one" $X_a$ bit. The $f_p$ signal is inverted in an inverter 144 and applied to an AND gate 146, which also receives the $Z_1$ tone. That AND gate 146 will produce an output when the position of the $Z_1$ tone indicates that the $X_a$ bit is a binary "zero" bit. The symbol detector 140 operates in the manner stated since the $Z_1$ tone will appear during the first half cycle of the processing signal $f_p$ if the phase angle thereof is zero degrees, and in the second half cycle of the processing signal if the phase angle thereof is 180°. The inverter 144 provides a high level input to the AND gate 146 in the second 180° of the $f_p$ signal. Accordingly, the AND gate 146 provides an output representing an $X_a$ "zero" bit, and the AND gate 142 provides an output representing an $X_a$ "one" bit.

These bits may be stored in the stages of an output register 148 to which the $X_a$ bit is assigned. The register 148 also receives outputs indicated as $Z_2$, $Z_3$ and $Z_4$ from the other detection networks, 62, 64 and 66 so that the $X_b$, $X_c$ and $X_d$ bits may be stored in the output register. This output register may be read out at a rate which is four times the receiver time base frequency in order that it is cleared at the beginning of each symbol interval.

The outputs of the AND gates 142 and 146 are connected to the set inputs of flip-flops 150 and 152, respectively, and store the value of the $X_a$ bit which is detected during a symbol interval. The value of the bit which is detected during this symbol interval is reflected in the phase of the processing signal which is presented to the modulators 116 and 122 because of the operation of gates 108, 112 and 114 and the inverter 110. Thus, if the $f_{1T}$ tone has a phase modulation of 0° so as to represent a binary "1" bit, the flip-flop 150 will be set. The AND gate 180 will be enabled, while the AND gate 112 is inhibited, since the flip-flop 152 is in its reset condition. Accordingly, the $f_p$ signal will bear a 0° phase shift. On the other hand, if the flip-flop 152 is set by virtue of a $Z_1$ output of the AND gate 146, the inverted $f_p$ signal will be applied to the modulators 116 and 122. Since the phase of the $y_R$ output contains the phase shift of the processing signal (see EQUATION 6), the phase of the $y_R$ output represents the differential phase shift between the tone transmitted in successive symbol intervals. The recovery system therefore provides demodulation of the time differential phase shift keyed information tones transmitted by the transmitter, only the admissible phase shifts are preserved in the differential demodulating process. Phase errors due to phase perturbations are eliminated and not allowed to become cumulative, thereby materially improving error performance. It will also be observed that the circuits used in the system are for the most part digital logic circuits which are available as integrated circuits of high reliability. The illustrated system, therefore, will manifest a high degree of reliability.

From the foregoing description it will become apparent that there has been developed a communication system of the time differential phase shift keyed type. A simplified version of this system using four tones and bi-phase (0° or 180°) modulation has been illustrated in the interest of simplicity of presentation of the invention. It will be appreciated of course that the invention may be embodied in communications systems wherein a much larger number of tones are transmitted and have more complex type of phase shift keyed modulation such as quadrinary and octrinary modulation. Other modifications and variations in the herein-described embodiment of the invention will undoubtedly suggest themselves to those skilled in the art. Accordingly, the foregoing description should be taken merely as illustrative and not in any limiting sense.

What is claimed is:

1. A system for communication of information on a phase modulated tone which is transmitted from a transmitting point to a receiving point, said system comprising (a) means at said receiving point responsive to said tone for providing an output which is a function of the phase modulation thereof, (b) frequency generator means for providing a processing signal of variable phase, (c) means responsive to said output for modulating the phase of said processing signal in accordance with the phase modulation of said output, (d) means responsive to said phase modulated processing signal for controlling the phase of the signal produced by said frequency generator means, and (e) means for comparing phase modulated processing signal and the processing signal from said generator for deriving the transmitted information.

2. The invention as set forth in claim 1 wherein the means defined in subparagraph (a) is correlation detection means.

3. The invention as set forth in claim 1 wherein said frequency generating means comprises a source of pulses of constant frequency much higher than the frequency of said tones, a counter responsive to said pulses for dividing said constant frequency and providing said processing frequency signal, and means for controlling the rate at which said pulses are applied to said counter operated by said means set forth in subparagraph (d).

4. The invention as set forth in claim 1 wherein said means set forth in subparagraph (d) includes means for deriving from said frequency generating means a frequency which is $n$ times the frequency of said processing signal, where $n$ is equal to the number of admissible phase states of said modulated tone, each of said phase states representing a different information symbol, and means responsive to said signal of $n$ times the frequency of said processing signal and said phase modulated processing signal for providing an error signal representing the sense of the variation in phase relation between said processing signal and said transmitted tone, and means for controlling the phase of said frequency generating means in accordance with said error signal.

5. The invention as set forth in claim 1 wherein the element defined in subparagraph (c) includes a pair of modulators, means for applying signals corresponding to sine and cosine functions of said processing signal to different ones of said modulators, means for applying said output to said modulators, said output which is applied to the modulators which receives the sine of said processing signal having the cosine function of said output applied thereto, said modulator which receives the cosine of said processing signal having the sine function of said output applied thereto, means for additively combining the outputs of said modulators for producing a pulse having a frequency equal to the frequency of said processing signal and a phase position corresponding to the phase displacement of said output.

6. The invention as set forth in claim 1 including means for changing the phase of said processing signal which is applied to said modulating means in accordance with the information derived by said comparing means as to the phase of said information tone.

7. The invention as set forth in claim 6 wherein said information is transmitted in accordance with a plurality of discrete phase shifts of said modulated tone, and wherein said frequency generating means includes a plurality of circuits for shifting the phase of said processing signal by each of discrete phase increments, and means responsive to said information deriving means for applying signals from one of said phase shift circuits to said modulating means.

8. The invention as set forth in claim 2 wherein said modulating means includes a pair of modulators, one for receiving the sine output from said correlation detection means and the other for receiving the cosine output from said correlation detection means, and means for applying sine and cosine functions of said processing signal respectively to said modulator which receives said cosine and sine outputs, means for adding the outputs of said modulators, means for producing a pulse from the output of said adding means at the same phase position during each cycle thereof, and wherein said comparing means includes gating circuits for comparing said pulse, and a square wave signal at said processing frequency for deriving said transmitted information.

9. A communication system in which elements of information are transmitted from a receiving point to a transmitting point in accordance with the phase modulation of a tone, said system comprising (a) means at said receiving point for detecting the phase modulation of said tone and providing an output corresponding thereto, (b) means for generating a processing signal of variable phase and of frequency much higher than said tone, (c) means responsive to variation in phase modulation of said transmitted tone as represented by said output detected by said detection means for phase locking said processing signal to said transmitted tone, (d) means for modulating said processing signal in accordance with said output, and (e) means responsive to said phase locked processing signal and said modulated processing signal for deriving said transmitted information.

10. The invention as set forth in claim 9 wherein said phase modulation of said tone is variable among a plurality of discrete phase shift increments during successive periods of a time base frequency, and wherein means are provided for applying said processing signal to said modulation means in each period with the discrete phase shift corresponding to the phase modulation of the tone transmitted during the preceding period of said time base frequency.

References Cited

UNITED STATES PATENTS

| | | | |
|---|---|---|---|
| 3,172,046 | 3/1965 | Paufve et al. | 325—346 X |
| 3,305,636 | 2/1967 | Webb | 178—67 |
| 3,353,101 | 11/1967 | Kawai et al. | 325—320 |
| 3,402,265 | 9/1968 | Couvillon | 178—67 X |
| 3,404,229 | 10/1968 | Downey et al. | 178—67 |

RICHARD MURRAY, Primary Examiner

W. S. FROMMER, Assistant Examiner

U.S. Cl. X.R.

325—30, 320; 328—133, 155